(12) United States Patent
Tomioka et al.

(10) Patent No.: US 9,841,636 B2
(45) Date of Patent: Dec. 12, 2017

(54) LIQUID CRYSTAL DISPLAY DEVICE

(71) Applicant: Japan Display Inc., Tokyo (JP)

(72) Inventors: Yasushi Tomioka, Tokyo (JP); Osamu Itou, Tokyo (JP); Toshimasa Ishigaki, Tokyo (JP); Hidehiro Sonoda, Tokyo (JP); Yosuke Hyodo, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/249,454

(22) Filed: Apr. 10, 2014

(65) Prior Publication Data

US 2014/0307209 A1    Oct. 16, 2014

(30) Foreign Application Priority Data

Apr. 12, 2013  (JP) .................. 2013-084082

(51) Int. Cl.
  *G02F 1/1339*   (2006.01)
  *G02F 1/1337*   (2006.01)

(52) U.S. Cl.
  CPC .... *G02F 1/13394* (2013.01); *G02F 1/133788* (2013.01); *G02F 2001/13398* (2013.01)

(58) Field of Classification Search
  CPC ............. G02F 1/13394; G02F 1/13392; G02F 1/1339; G02F 2001/13396; G02F 2001/13398; G02F 1/133377; G02F 1/133788
  USPC ........................................................ 349/156
  See application file for complete search history.

(56) References Cited

U.S. PATENT DOCUMENTS

| | | | |
|---|---|---|---|
| 6,774,974 B1* | 8/2004 | Matsuyama | G02F 1/13394 349/123 |
| 2002/0051112 A1* | 5/2002 | Katsura | G02F 1/1337 349/153 |
| 2007/0002263 A1* | 1/2007 | Kim et al. | 349/156 |
| 2009/0059155 A1* | 3/2009 | Nakayama et al. | 349/156 |
| 2012/0135661 A1 | 5/2012 | Imanishi et al. | |
| 2012/0224114 A1* | 9/2012 | Kunimatsu et al. | 349/42 |

FOREIGN PATENT DOCUMENTS

| | | |
|---|---|---|
| JP | 11-174462 A | 7/1999 |
| JP | 2012-113212 A | 6/2012 |

* cited by examiner

*Primary Examiner* — Nathanael R Briggs
*Assistant Examiner* — William Peterson
(74) *Attorney, Agent, or Firm* — Typha IP LLC

(57) ABSTRACT

A high-definition and high-contrast liquid crystal display device having a high aperture ratio without light leakage around a columnar spacer is provided. The liquid crystal display device of a horizontal electric field type includes a TFT substrate with a pixel electrode and a common electrode, a color filter substrate with a color filter, a columnar spacer interposed between the substrates, and a liquid crystal layer arranged between the substrates. A liquid crystal alignment film formed between the substrates is a photo-alignment film. The columnar spacer, formed on the color filter substrate or the TFT substrate, has a wall-like shape and an inclined surface extending in a direction parallel to or perpendicular to a direction in which the liquid crystal is initially aligned.

15 Claims, 10 Drawing Sheets

F I G . 3 A
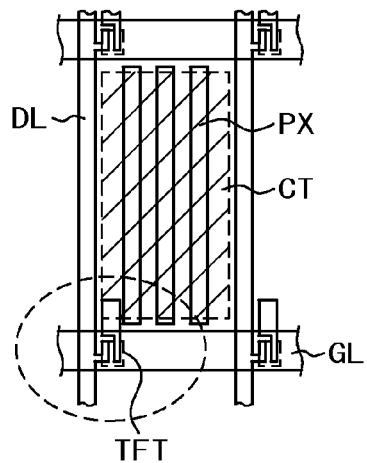
F I G . 3 B
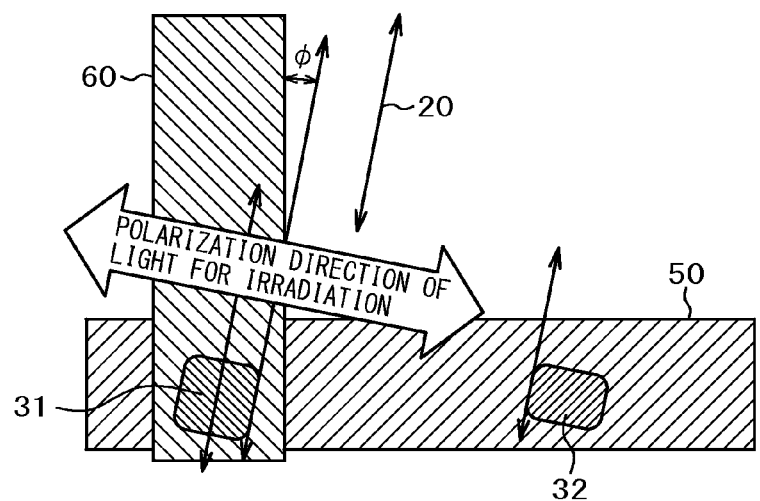
F I G . 3 C
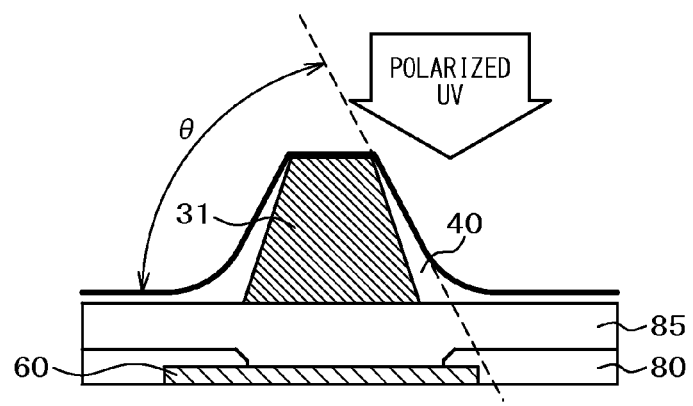

LIQUID CRYSTAL DISPLAY DEVICE

CLAIM OF PRIORITY

The present application claims priority from Japanese patent application JP2013-084082 filed on Apr. 12, 2013, the content of which is hereby incorporated by reference into this application.

BACKGROUND OF THE INVENTION

1. Field of the Invention

The present invention relates to a liquid crystal display device provided with a photo-alignment film, and more particularly to a high-definition and high-contrast liquid crystal display device with a high aperture ratio.

2. Description of the Related Art

Regarding liquid crystal display devices, in order to achieve a wide viewing angle, liquid crystal display devices of horizontal electric field types such as an in-plane switching (IPS) type and a fringe field switching (FSS) type have been developed. A liquid crystal display device of a horizontal electric field type controls the backlight intensity and displays an image by applying an electric field in a direction parallel to a substrate and rotating liquid crystal molecules in a horizontal plane in a state in which the liquid crystal molecules are horizontally aligned or in a homogeneous alignment state.

In addition, for a liquid crystal display element, a photo-alignment method has been proposed as a processing method for adding an aligning ability to a liquid crystal alignment film. The photo-alignment method is characterized by irradiating a polymer film containing photoisomerizable compounds such as azo dyes with linearly polarized ultraviolet light (polarized UV light) or the like, causing a photoisomerizable compound oriented in a polarization direction or a polymer chain to selectively react, further causing anisotropy in alignment of molecules of the polymer film, thereby obtaining the liquid crystal aligning ability.

As a liquid crystal display device of the horizontal electric field type provided with a photo-alignment film, JP-A-2012-113212 discloses an IPS type or FSS type liquid crystal display device that has a frustum-shaped spacer formed on an opposing substrate and has a photo-alignment film formed therein.

In addition, JP-A-H11-174462 discloses a liquid crystal display device of a horizontal electric field driving type without a photo-alignment film, in which columnar insulating films (columnar spacers) having a side surface with a cross-sectional shape parallel to a rubbing direction are located at each intersection of electrode wirings arranged in a matrix form (refer to Abstract of JP-A-H11-174462).

SUMMARY OF THE INVENTION

In a liquid crystal display device, a cylindrical or quadrangular column-shaped spacer is formed on a thin film transistor (TFT) substrate or a color filter substrate as a columnar spacer (spacer on color filter (SOC)) that maintains an interval between the TFT substrate and the color filter substrate at a predetermined level. If the photo-alignment method is applied to the liquid crystal display device of the horizontal electric field type, and a side surface of the columnar spacer (SOC) is gently inclined, alignment of liquid crystal that exists around the columnar spacer is adequate. However, if the width of a light shielding black matrix on which the columnar spacer is arranged is reduced in order to achieve a high-definition display and increase an aperture ratio, the diameter of the columnar spacer is reduced and an inclination angle of the side surface of the columnar spacer is increased. Thus, the alignment of liquid crystal exists around the columnar spacer is distorted and achieving both high contrast and high aperture ratio is difficult.

This state is described below with reference to FIG. 2. In FIG. 2, a cylindrical spacer (SOC) 30 is used. For a liquid crystal display device of the IPS type, in principle, it is necessary to initially align liquid crystal molecules 10 at a certain angle (bias angle) or more with respect to a direction in which electrodes extend. Thus, a polarization axis of light for irradiation is normally inclined at a certain angle with respect to the direction in which the electrodes extend. As illustrated in FIG. 2, since the polarization axis of the light for irradiation is not parallel to and not perpendicular to an inclined surface of the columnar spacer 30, a polarization axis of light with which a region of a surface of a flat alignment film located around the columnar spacer is directly irradiated is different from a polarization axis of reflected light with which the alignment film is irradiated again (since the light is not completely p-polarized or s-polarized light, the polarization axis of the reflected axis is shifted). Thus, a dual-axis liquid crystal aligning ability is added to the region of the surface of the alignment film, and an alignment failure of liquid crystal molecules occurs. In the liquid crystal display device of the IPS type, distortion of alignment is easily noticeable and the alignment failure easily causes leakage of light, compared with other types. As illustrated in FIG. 2, regardless of whether a cylindrical spacer or a quadrangular column-shaped spacer is used, light leaks in regions (light leakage regions) 70 in which a polarization axis of light for irradiation is not parallel to and not perpendicular to an inclined surface of the cylindrical or quadrangular column-shaped spacer.

A black matrix may be provided to shield light in the light leakage regions 70 for preventing contrast from being reduced due to the leakage of light around the columnar spacer 30. However, even if high contrast is maintained by causing the black matrix to shield light, an aperture ratio is reduced by the shielding. Consequently, it is difficult to achieve both high aperture ratio and high contrast.

An object of the invention is to provide a high-definition and high-contrast liquid crystal display device that prevents light from leaking around a columnar spacer and has a high aperture ratio.

To solve the aforementioned problems, a liquid crystal display device according to the invention is described below. The liquid crystal display device of a horizontal electric field type includes a TFT substrate with a pixel electrode and a common electrode, an opposing substrate facing the TFT substrate, a columnar spacer interposed between the substrates, and a liquid crystal layer arranged between the substrates. A liquid crystal alignment film formed between the TFT substrate and the opposing substrate is a photo-alignment film. The columnar spacer, formed on the opposing substrate or the TFT substrate, has a wall-like shape and an inclined surface extending in a direction parallel to or perpendicular to a direction in which the liquid crystal is initially aligned.

For the liquid crystal display device according to the invention, it is preferable that the columnar spacer has a quadrangular-column shape with a substantially quadrilateral top portion, and four end sides of the spacer extend in a direction nearly parallel to or nearly perpendicular to the direction in which the liquid crystal is initially aligned.

According to the invention, a high-definition and high-contrast liquid crystal display device having a high aperture ratio without light leakage around the columnar spacer is provided.

BRIEF DESCRIPTION OF THE DRAWINGS

FIG. 3A is a plan view of a structure of a single pixel included in a liquid crystal display device according to a second embodiment of the invention.

FIG. 3B is an enlarged view of a structure near a columnar spacer included in the liquid crystal display device according to the second embodiment of the invention.

FIG. 3C is a cross-sectional view of a structure near the columnar spacer included in the liquid crystal display device according to the second embodiment of the invention.

DETAILED DESCRIPTION OF THE INVENTION

A conventional liquid crystal display device is described before the embodiments of the present invention are described.

Figure 9:
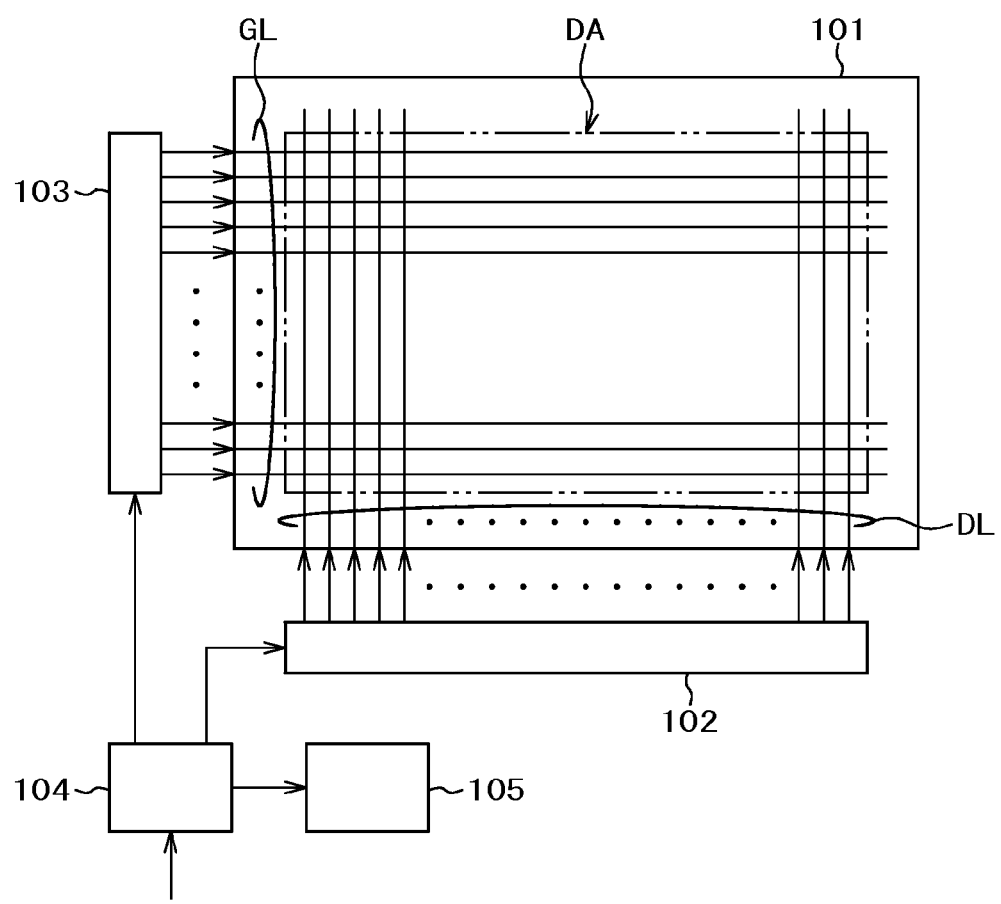
FIG. 9 is a diagram illustrating an outline configuration of a liquid crystal display device.

FIG. 9 is a diagram illustrating an example of an outline configuration of the liquid crystal display device described in JP-A-2012-11312. The liquid crystal display device includes a liquid crystal display panel 101, a first driving circuit 102, a second driving circuit 103, a control circuit 104, and a backlight 105. The liquid crystal display panel 101 has a plurality of scanning signal lines GL (gate lines) and a plurality of video signal lines DL (drain lines). The video signal lines DL are connected to the first driving circuit 102, while the scanning signal lines GL are connected to the second driving circuit 103. A display region DA of the liquid crystal display panel 101 is made up of a group of pixels. A region occupied by each pixel in the display region DA corresponds to a region surrounded by adjacent two scanning signal lines GL and adjacent two video signal lines DL, for example.

The liquid crystal display panel 101 has a structure in which alignment films are formed on a TFT substrate and an opposing substrate (color filter substrate) and a liquid crystal layer LC (liquid crystal material) is arranged between the alignment films. In addition, a plurality of columnar spacers are arranged in a space in which the liquid crystal layer LC is sealed. The columnar spacers hold the thickness (cell gap) of the liquid crystal layer LC to be uniform at the pixels, and for example, are arranged on the color filter substrate.

Figure 10:
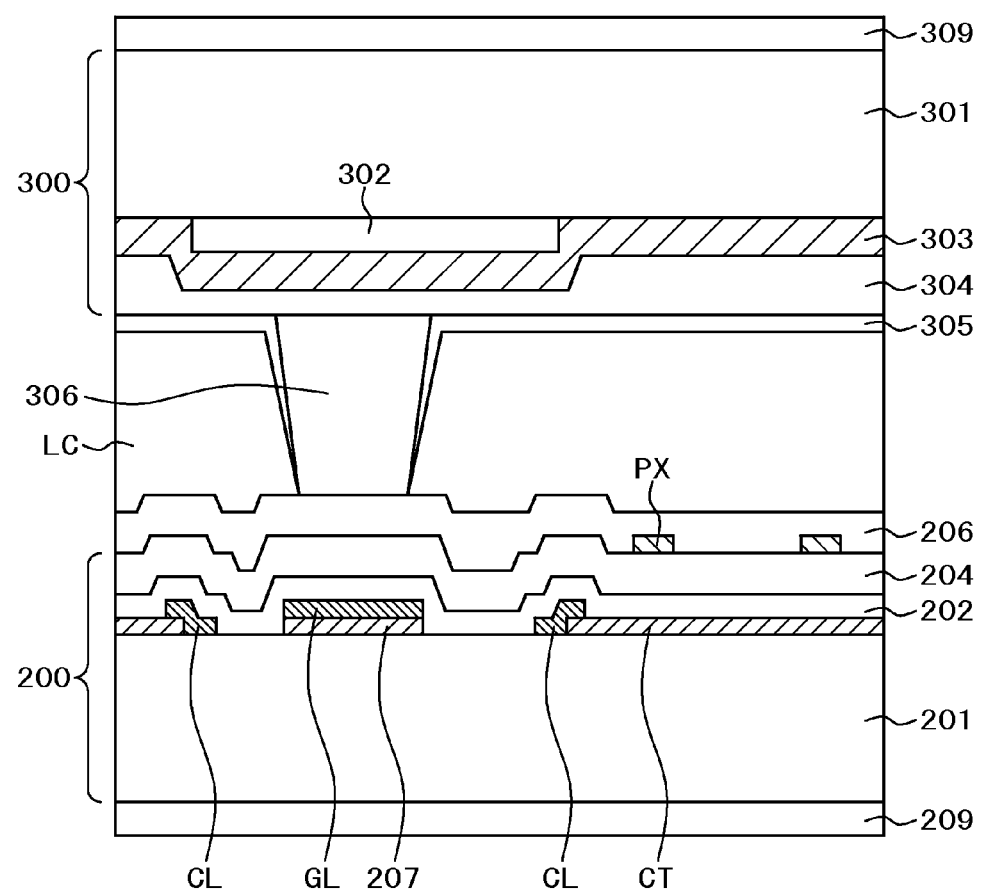
FIG. 10 is a diagram illustrating an outline configuration of a liquid crystal display panel of a horizontal electric field type.

FIG. 10 illustrates an example of an outline configuration of a liquid crystal display panel of a horizontal electric field type. In a TFT substrate 200, a common electrode CT, scanning signal lines GL, a common wiring CL, and a first insulating layer 202 covering the above are formed on a surface of an insulating substrate such as a glass substrate 201. A semiconductor layer of TFT elements, video signal lines DL, source electrodes 207, and a second insulating layer 204 covering the above, although some of them are not shown, are formed on the first insulating layer 202. In this case, the video signal lines DL and the source electrodes 207 each have an extended part over the semiconductor layer. These extended parts function as drain electrodes for the TFT elements and source electrodes for the TFT elements. Pixel electrodes PX and an alignment film 206 covering the pixel electrodes PX are formed on the second insulating layer 204. The pixel electrodes PX are connected to the source electrode 207 through contact holes extending through the second insulating layer 204. In this case, the common electrode CT is formed on the surface of the glass substrate 201. More specifically, the common electrode CT is formed in a plate-like shape in a region (opening region) surrounded by adjacent two scanning signal lines GL and adjacent two video signal lines DL. The pixel electrodes PX each having a plurality of slits are stacked above the plate-like common electrode CT. Additionally, the common wiring CL causes the common electrode CT, where the pixels arranged in a direction in which the scanning signal lines GL extend, to be used in common.

In a color filter substrate 300, a black matrix 302, a color filter 303, and an overcoat layer 304 covering the above are formed on a surface of an insulating substrate such as a glass substrate 301. For example, a light shielding film having a grid-like form is used as the black matrix to provide an opening region for each pixel in a display region DA. A plurality of columnar spacers 306 and an alignment film 305 are formed on the overcoat layer 304. The columnar spacers 306 each are formed in a frustum shape with a flat top portion, for example. The columnar spacers 306 are grounded and overlap parts of the scanning signal lines GL of the TFT substrate 200, the parts except where the TFT elements are arranged and where the scanning signal lines GL are intersected with the video signal lines DL. The alignment film 305 is formed of polyimide resin and processed so as to have a liquid crystal aligning ability, for example. In FIG. 10, reference numerals 209 and 309 represent polarizing plates.

In such a liquid crystal display device, cylindrical spacers as the columnar spacer have been traditionally used. A photo-alignment film is used as the alignment film 305. When a photo-alignment process is performed, leakage of light occurs around the columnar spacers 306 and this causes a reduction in contrast. The contrast can be maintained by increasing a region covered by the black matrix 302 and shielding light in a light leakage region, but there is a problem that an aperture ratio is reduced by the light shielding.

The same problem occurs in a following configuration, although not shown in FIG. 10: an organic insulating film is arranged under the pixel electrodes PX, the common electrode CT, and the insulating film 204 formed between the common electrode CT and the pixel electrodes PX so that the above components are arranged in a top layer, thereby the pixel electrodes PX and the common electrode CT are electrically connected to the TFT elements.

Hereinafter, the embodiments of the invention are described with reference to the other accompanying drawings. In the drawings describing the embodiments, elements that have the same functions are represented by the same reference numerals and symbols, and a repetitive description thereof is omitted.

First Embodiment

Figure 1A:
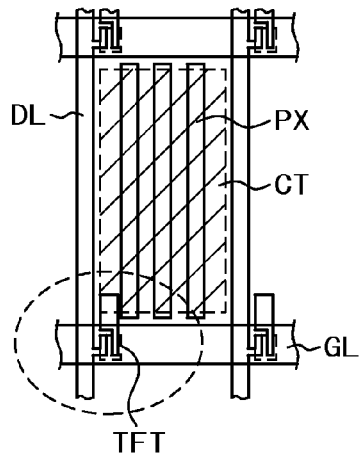
FIG. 1A is a plan view of a structure of a single pixel included in a liquid crystal display device according to a first embodiment of the invention.
Figure 1B:
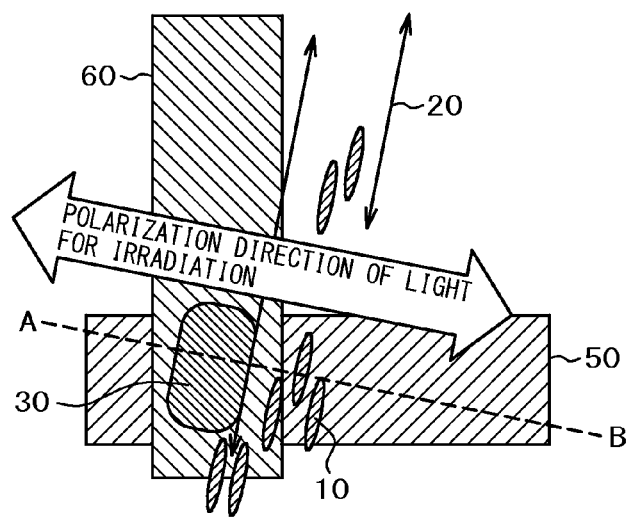
FIG. 1B is a plan view of a structure near a columnar spacer included in the liquid crystal display device according to the first embodiment of the invention.
Figure 1C:
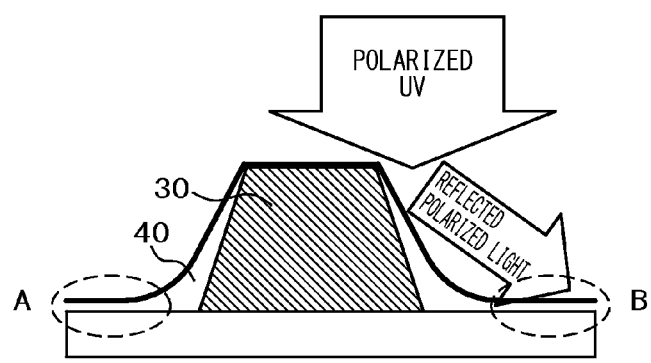
FIG. 1C is a cross-sectional view of a structure near the columnar spacer included in the liquid crystal display device according to the first embodiment of the invention.
Figure 2:
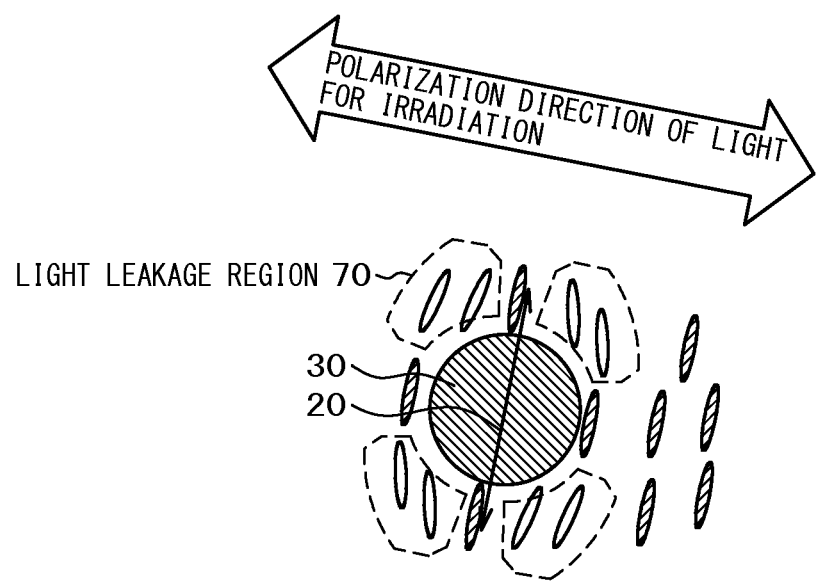
FIG. 2 is a diagram describing a problem with a conventional liquid crystal display device.

FIGS. 1A to 1C describe a structure of a liquid crystal display device according to a first embodiment of the invention. FIG. 1A is a plan view of a single pixel. FIG. 1B is a plan view of a structure near a columnar spacer (SOC) arranged on a color filter substrate. FIG. 1C is a cross-sectional view of a structure near the columnar spacer, taken along a dotted line A-B illustrated in FIG. 1B.

Referring to FIG. 1A, each of pixels is formed by scanning signal lines GL extending in a lateral direction and video signal lines DL extending in a longitudinal direction. Each of the pixels has a common electrode CT and a pixel electrode PX, while the pixel electrode PX is connected to the signal lines through a TFT element. FIG. 1B is the enlarged view of the structure near the columnar spacer (a corresponding region of the color filter substrate) opposing the pixel illustrated in FIG. 1A. Lateral black matrix portions 50 and longitudinal black matrix portions 60 are arranged, while columnar spacers 30 are arranged at positions at which the lateral black matrix portions 50 intersect with the longitudinal black matrix portions 60. For example, if the liquid crystal display device is of the IPS type, it is necessary that liquid crystal molecules 10 be initially aligned at a certain bias angle or more with respect to a direction in which the electrodes extend (direction in which the longitudinal black matrix portions 60 extend), as indicated by arrows 20, in order to uniformly rotate the liquid crystal molecules. Thus, a polarization direction of light for irradiation is inclined at a certain angle with respect to a direction perpendicular to the direction in which the electrodes extend (direction in which the lateral black matrix portions 50 extend).

In the present embodiment, each of the columnar spacers 30 has an inclined surface and has a linear wall at a part of the columnar spacer 30, while the linear wall extends in the direction 20 in which the liquid crystal is initially aligned. Specifically, each of the columnar spacers 30 has a wall-like shape and has an inclined surface extending in the direction 20 in which the liquid crystal is initially aligned. Each of the columnar spacers may have a wall-like shape and an inclined surface extending in the direction perpendicular to the direction 20 in which the liquid crystal is initially aligned. Inclination angles of the wall surfaces (inclined surface) of the columnar spacers 30 are equal to or larger than 45 degrees and smaller than 90 degrees, preferably in a range of 60 to 80 degrees. In this configuration, UV is completely p-polarized or s-polarized with respect to the inclined surfaces of the columnar spacers 30, as illustrated in FIG. 1C. Thus, a polarization axis of reflected light does not change, an adequate alignment direction can be maintained in pixel regions around the columnar spacers 30 for an alignment film 40, and the amount of leaking light can be reduced.

A photo-alignment process in present embodiment is performed by the irradiation with the nearly linearly polarized light through the photo-alignment film. Liquid crystal around an inclined portion of each columnar spacer is aligned in a direction nearly parallel to or nearly perpendicular to the inclined portion of the columnar spacer. Since liquid crystals are controlled to be aligned in the direction in which the liquid crystal is initially aligned, and thus light leakage caused by an irregularity of the initial alignment can be significantly suppressed.

More specifically, the photo-alignment process provides an adequate alignment around the columnar spacers even if the light shielding black matrix's width reduces, the columnar spacer's diameter reduces, or an inclination angle of the side surface of the columnar spacer increases, when improving the definition of a liquid crystal display device.

Second Embodiment

FIGS. 3A to 3C are diagrams describing a structure of a liquid crystal display device according to a second embodiment of the invention. FIG. 3A is a plan view of a single element. FIG. 3B is an enlarged view of a region near a columnar spacer formed on the color filter substrate. FIG. 3C is a cross sectional view of a structure near the columnar spacer. In the second embodiment, columnar spacers are formed immediately under points at which the longitudinal black matrix portions intersect with the lateral black matrix portions or immediately under the lateral black matrix portions.

Referring to FIG. 3A, each of pixels is formed by scanning signal lines GL extending in the lateral direction and video signal lines DL extending in the longitudinal direction. Each of the pixels has a common electrode CT and a pixel electrode PX. The pixel electrodes are connected to the signal lines through TFT elements. FIG. 3B is the enlarged view of the structure near the columnar spacer opposing the pixel illustrated in FIG. 3A and arranged in a corresponding region of the color filter substrate. The longitudinal black matrix portions 60 and the lateral black matrix portions 50 are arranged correspond to the video signal lines DL and the scanning signal lines GL, respectively. The liquid crystal is aligned in a direction 20 at a bias angle $\phi$ of approximately 5 to 15 degrees with respect to the direction in which the longitudinal black matrix portions 60 or the pixel electrodes PX extend. A main spacer 31 (having a height h) is formed immediately under the point at which the longitudinal black matrix portion 60 and the lateral black matrix portion 50 intersect with each other, while a subspacer 32 (having a height h' smaller than the height h) is formed immediately under the lateral black matrix portion 50. The subspacer 32 is provided for a pressing on a touch panel, for example. FIG. 3C illustrates the cross-sectional view of the structure near a main spacer 31 formed on the color filter substrate. For example, the longitudinal black matrix portions 60 and a color filter layer 80 are formed on a glass substrate (not illustrated), and a transparent insulating layer 85 is formed thereon. The columnar spacers 31 that each have an inclined side surface are formed on the transparent insulating layer 85. An inclination angle θ of each of the side surfaces of the columnar spacers 30 is equal to or larger than 45 degrees and smaller than 90 degrees, preferably in a range of 60 to 80 degrees. A material for a photo-alignment film 40 is coated on the transparent insulating layer 85 and the side surfaces of the columnar spacers 31, and the photo-alignment film 40 is formed by irradiation with polarized UV. Although the subspacer 32 is formed immediately under the lateral black matrix portion 50 as illustrated in FIG. 3B, the subspacer 32 may be formed immediately under the longitudinal black matrix portion 60.

In the present embodiment, the columnar spacers that are the main spacers 31 and the subspacers 32 each have a nearly quadrangular top portion and are quadrangular column-shaped spacers. Four end sides of each of the columnar spacers are nearly parallel to or nearly perpendicular to the direction 20 in which the liquid crystal is initially aligned.

According to the present embodiment, the following effects are expected. An IPS type liquid crystal display having higher definition involves more surface irregularities with wiring electrodes and pixel electrodes. In this case, however, since the photo-alignment method is used, it is possible to prevent a failure of alignment at an uneven portion and achieve high contrast. In addition, the widths of the light-shielding black matrix portions are set to small values in order to reduce power consumption and thereby increase the aperture ratio. Furthermore, the quadrangular column-shaped spacers each having a high aspect ratio are formed on the black matrix portions, thereby the side surfaces of the quadrangular column-shaped spacers are parallel to or perpendicular to the direction in which the liquid crystal is aligned. This configuration can prevent light from leaking around the columnar spacers due to reflected light caused by irradiation with polarized light in the photo-alignment process. It is, therefore, possible to ensure a high aperture ratio and a high contrast ratio, while maintaining high definition in the liquid crystal display device.

Third Embodiment

Figure 4A:
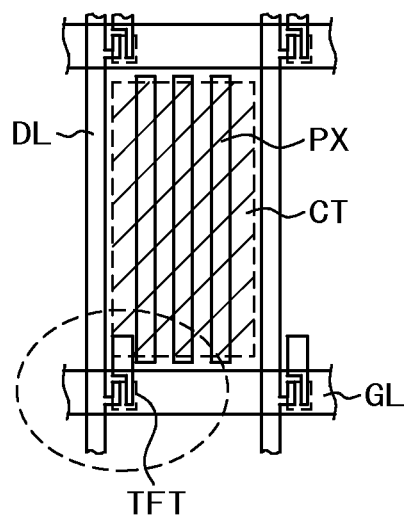
FIG. 4A is a plan view of a structure of a single pixel included in a liquid crystal display device according to a third embodiment of the invention.
Figure 4B:
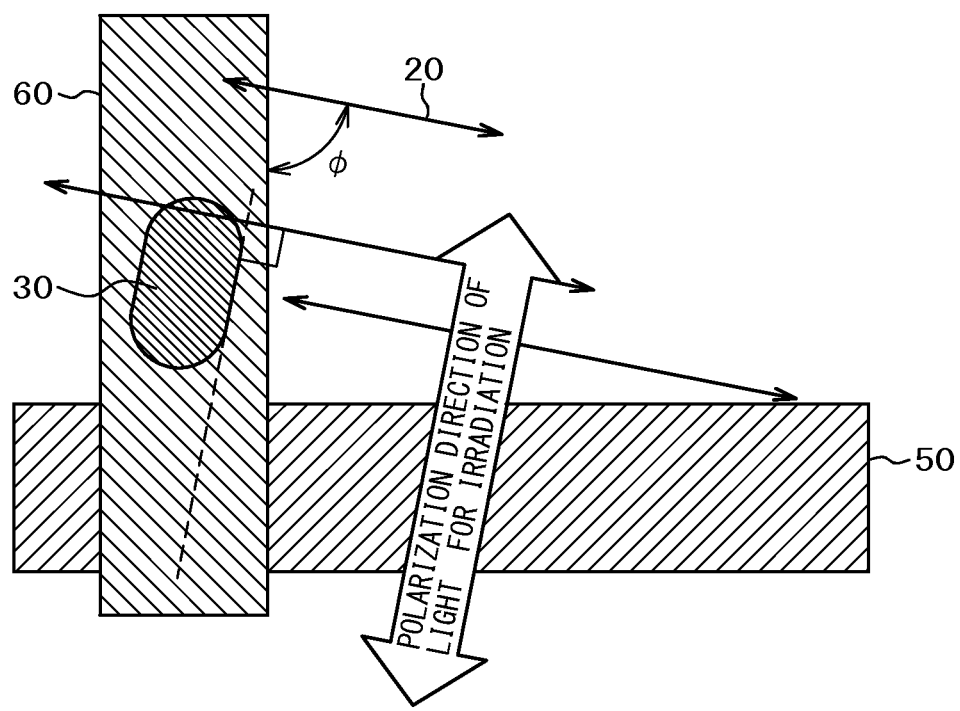
FIG. 4B is an enlarged view of a structure near a columnar spacer included in the liquid crystal display device according to the third embodiment of the invention.

FIGS. 4A and 4B are diagrams describing a structure of a liquid crystal display device according to a third embodiment of the invention. FIG. 4A is a plan view of a single pixel, like FIG. 3A. FIG. 4B is an enlarged view of a region near a columnar spacer formed on the color filter substrate. In the third embodiment, the columnar spacer 30 is formed immediately under the longitudinal black matrix portion 60, and negative liquid crystal is used.

As illustrated in FIG. 4B, the direction 20 in which the liquid crystal is initially aligned is set to a direction extending at a bias angle φ of approximately 75 to 85 degrees with respect to the direction in which the longitudinal black matrix portion 60 or the pixel electrode PX extends.

In the present embodiment, each of the columnar spacers 30 has an inclined surface and has a linear wall at a part of the columnar spacer 30, while the linear wall extends in a direction perpendicular to the direction 20 in which the liquid crystal is initially aligned. Specifically, each of the columnar spacers 30 has a wall-like shape and an inclined surface extending in the direction perpendicular to the direction in which the liquid crystal is initially aligned. In this configuration, the negative liquid crystal is used and UV is nearly completely p-polarized or s-polarized with respect to the inclined surfaces of the columnar spacers 30. Thus, a polarization axis of reflected light does not change, an adequate alignment direction can be maintained in pixel regions around the columnar spacers for the alignment film, and the amount of leaking light can be reduced.

A photo-alignment process in the present embodiment is also performed by the irradiation with the nearly linearly polarized light through the photo-alignment film, and light leakage caused by an irregularity of the initial alignment can be significantly suppressed.

Fourth Embodiment

Figure 5A:
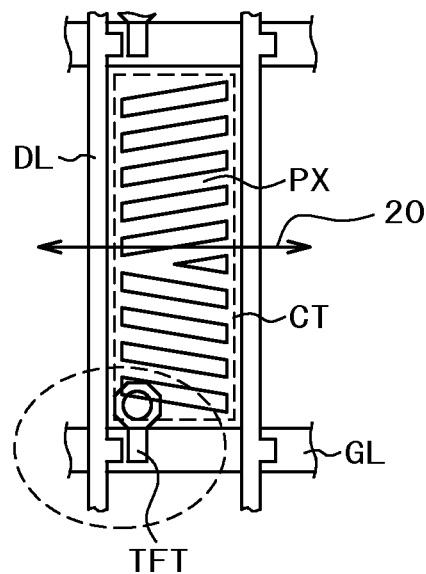
FIG. 5A is a plan view of a structure of a single pixel included in a liquid crystal display device according to a fourth embodiment of the invention.
Figure 5B:
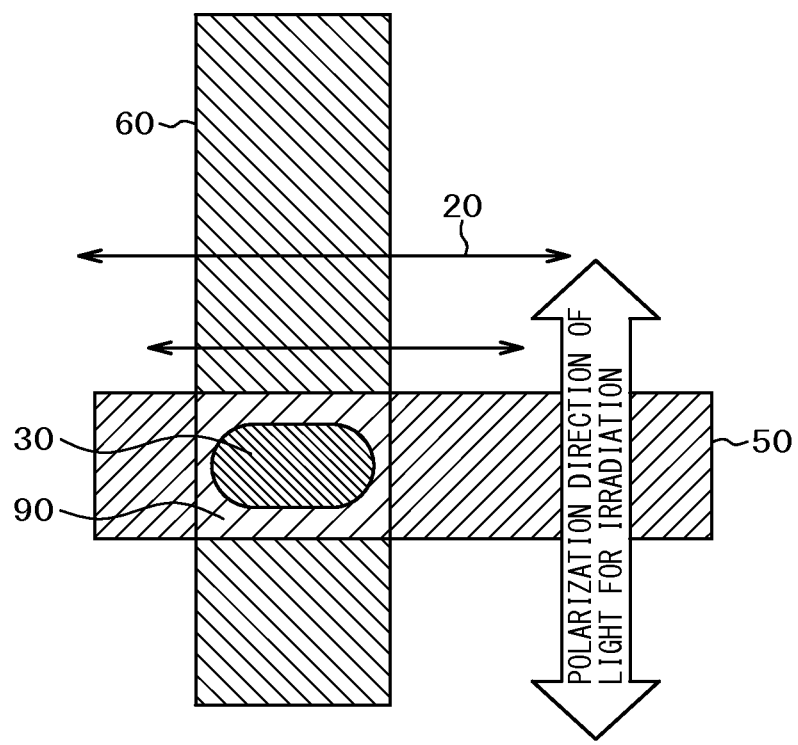
FIG. 5B is an enlarged view of a structure near a columnar spacer included in the liquid crystal display device according to the fourth embodiment of the invention.

FIGS. 5A and 5B are diagrams describing a structure of a liquid crystal display device according to a fourth embodiment of the invention. FIG. 5A is a plan view of a single pixel, while FIG. 5B is an enlarged view of a region near a columnar spacer formed on the color filter substrate. The fourth embodiment is applied to the liquid crystal display device in which a viewing angle is compensated for by dividing pixel regions.

As illustrated in FIG. 5A, each of pixels is divided into an upper half region and a lower half region. Slits of pixel electrodes PX in the above two regions are inclined in directions opposing each other with respect to the lateral direction or a direction 20 in which the liquid crystal is initially aligned. In the liquid crystal display device, the viewing angle can be compensated for by dividing each pixel region.

As illustrated in FIG. 5B, the direction 20 in which the liquid crystal is initially aligned is set to the lateral direction or the direction in which the lateral black matrix portion 50 extends. The columnar spacer 30 is arranged at the point at which the longitudinal black matrix portion 60 intersects with the lateral black matrix portion 50. The columnar spacer 30 has an inclined surface and has a linear wall at part of the columnar spacer 30. The linear wall extends in the lateral direction or the direction 20 in which the liquid crystal is initially aligned. In this configuration, since UV is nearly completely p-polarized or s-polarized with respect to the inclined surfaces of the columnar spacer 30, a polarization axis of reflected light does not change. Thus, an adequate alignment direction can be maintained in pixel regions around the columnar spacers, the amount of leaking light can be reduced.

In addition, round portions of four corners of the columnar spacer 30 are arranged in a region 90 in which a longitudinal black matrix portion 60 overlaps a lateral black matrix portion 50, while the longitudinal black matrix portion 60 is nearly perpendicular to the lateral black matrix portion 50. In this configuration, regions in which liquid crystal molecules are abnormally aligned (aligned in directions different from a normal alignment direction) at round portions of four corners of the columnar spacers 30 are limited to regions where the black matrix portions shield light. Thus, light does not leak into a display region of the pixels, and high contrast can be achieved.

Fifth Embodiment

Figure 6A:
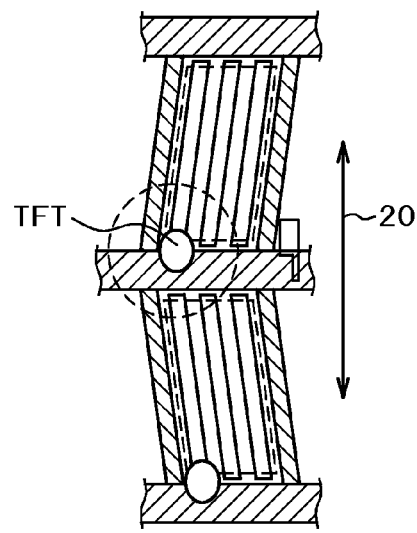
FIG. 6A is a plan view of a structure of adjacent two pixels included in a liquid crystal display device according to a fifth embodiment of the invention.
Figure 6B:
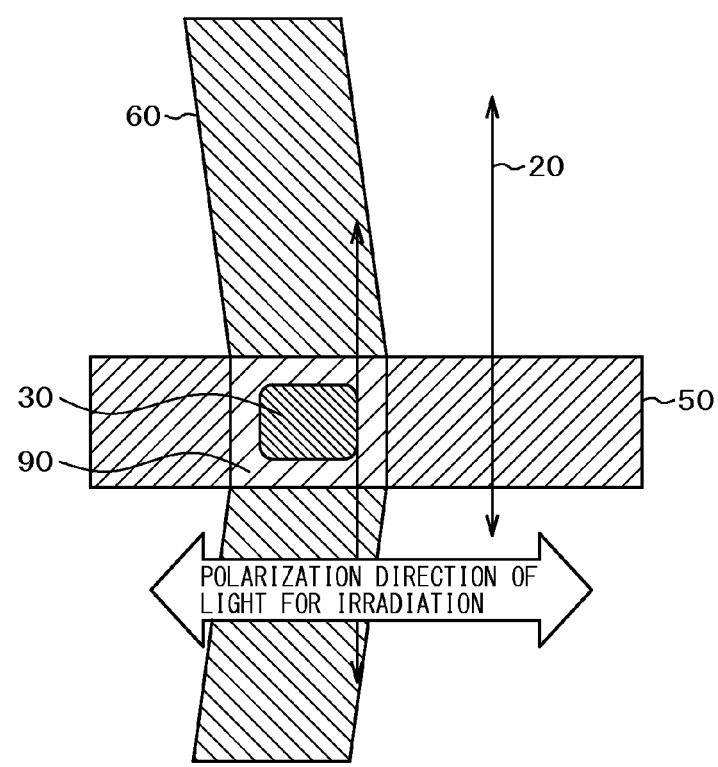
FIG. 6B is an enlarged view of a structure near a columnar spacer included in the liquid crystal display device according to the fifth embodiment of the invention.

FIGS. 6A and 6B are diagrams describing a structure of a liquid crystal display device according to a fifth embodiment of the invention. FIG. 6A is a plan view of two pixels located adjacent to each other in the vertical direction, while FIG. 6B is an enlarged view of a region near a columnar spacer formed on the color filter substrate. The fifth embodiment is applied to the liquid crystal display device in which a viewing angle can be compensated for by each pair of pixels located adjacent to each other in the vertical direction.

As illustrated in FIG. 6A, pixel electrodes PX of the pixels located adjacent to each other in the vertical direction are inclined in directions opposing each other with respect to the longitudinal direction or the direction 20 in which liquid crystal is initially aligned. In the liquid crystal display device, a viewing angle can be compensated for by inclining pixel electrodes PX of the pixels located adjacent to each other in directions opposing each other.

As illustrated in FIG. 6B, the direction 20 in which the liquid crystal is initially aligned is set to the longitudinal direction and inclined with respect to the direction in which the longitudinal black matrix portion 60 or the pixel electrode PX extends. The quadrangular column-shaped spacer 30 is arranged at the point at which the longitudinal black matrix portion 60 intersects with the lateral black matrix portion 50. Four end sides of each of the quadrangular column-shaped spacer 30 extend in a direction nearly parallel to or nearly perpendicular to the direction 20 in which the liquid crystal is initially aligned.

A photo-alignment process in the present embodiment is performed by the irradiation with the nearly linearly polarized light through the photo-alignment film. Since four end sides of each of the columnar spacers extend in the direction nearly parallel to or nearly perpendicular to the direction in which the liquid crystal is aligned, light leakage caused by an irregularity of the initial alignment can be significantly suppressed.

In addition, round portions (curved surface portions) of four corners of the quadrangular column-shaped spacer 30 are arranged in a region 90 in which a longitudinal black matrix portion 60 overlaps a lateral black matrix portion 50. In this configuration, regions in which liquid crystal molecules are abnormally aligned (aligned in directions different from a normal alignment direction) at round portions of four corners of the quadrangular column-shaped spacer are limited to regions where the black matrix portions shield light. Thus, light does not leak into a display region of the pixels, and high contrast can be achieved.

Sixth Embodiment

Figure 7A:
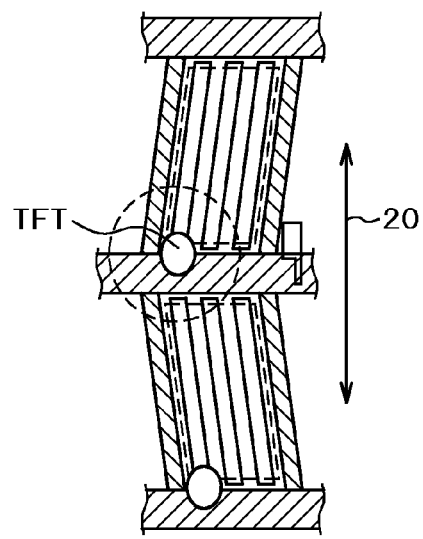
FIG. 7A is a plan view of a structure of adjacent two pixels included in a liquid crystal display device according to a sixth embodiment of the invention.
Figure 7B:
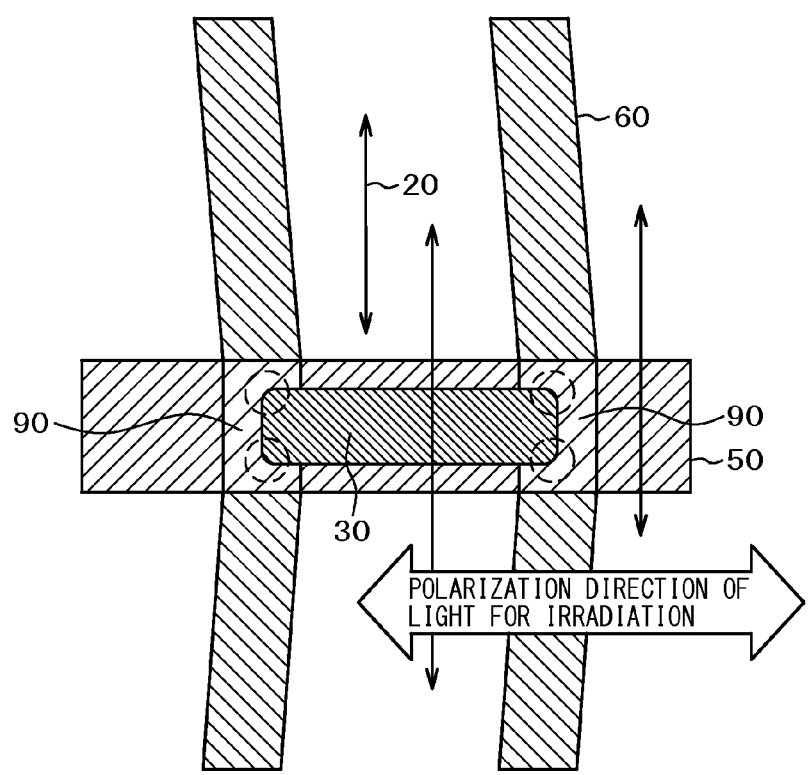
FIG. 7B is an enlarged view of a structure near a columnar spacer included in the liquid crystal display device according to the sixth embodiment of the invention.

FIGS. 7A and 7B are diagrams describing a structure of a liquid crystal display device according to a sixth embodiment of the invention. FIG. 7A is a plan view of two pixels located adjacent to each other in the vertical direction, while FIG. 7B is an enlarged view of a region near a columnar spacer formed on the color filter substrate. The sixth embodiment is applied to the liquid crystal display device in which a viewing angle is compensated for by each pair of pixels located adjacent to each other in the vertical direction.

As illustrated in FIG. 7A, in the present embodiment, pixel electrodes PX of the pixels located adjacent to each other in the vertical direction are inclined in directions opposing each other with respect to the longitudinal direction or the direction 20 in which the liquid crystal is initially aligned. The viewing angle can be compensated for by causing pixels located adjacent to each other in the longitudinal direction to be inclined in the directions opposing each other.

As illustrated in FIG. 7B, the direction 20 in which the liquid crystal is initially aligned is set to the longitudinal direction and inclined with respect to the directions in which the longitudinal black matrix portions 60 or the pixel electrodes PX extend. A quadrangular column-shaped spacer 30 having a rectangular top portion extends from one intersection point of a longitudinal black matrix portion 60 and a lateral black matrix portion 50 to an adjacent intersection point. Four end sides of the quadrangular column-shaped spacer 30 are nearly parallel to or nearly perpendicular to the direction 20 in which the liquid crystal is initially aligned.

A photo-alignment process in present embodiment is performed by the irradiation with the nearly linearly polarized light through the photo-alignment film. Since four end sides of each of the columnar spacers extend in the direction nearly parallel to or nearly perpendicular to the direction in which the liquid crystal is aligned, light leakage caused by an irregularity of the initial alignment can be significantly suppressed.

In addition, at least one of round portions (curved surface portions) of four corners of the quadrangular column-shaped spacer 30 is located in an intersection region 90 in which a longitudinal black matrix portion 60 intersects with a lateral black matrix portion 50, while the other round portions of the four corners of the quadrangular column-shaped spacer 30 are located in an adjacent intersection region 90. In this configuration, regions in which liquid crystal is abnormally aligned (aligned in directions different from a normal alignment direction) around the round portions of the four corners of the quadrangular column-shaped spacer 30 are limited to regions in which the black matrix portions shield light. Thus, high contrast can be achieved without the occurrence of leakage of light into a display pixel region.

Each of the embodiments of the invention describes as the color filter substrate, since a color filter is formed on the opposing substrate. In each of the embodiments of the invention, however, the color filter may be formed on the TFT substrate. In this case, the color filter substrate is interpreted as an opposing substrate, and thus the effects of the invention can be obtained. In addition, the columnar spacers may be formed on the TFT substrate.

Comparative Example

Figure 8A:
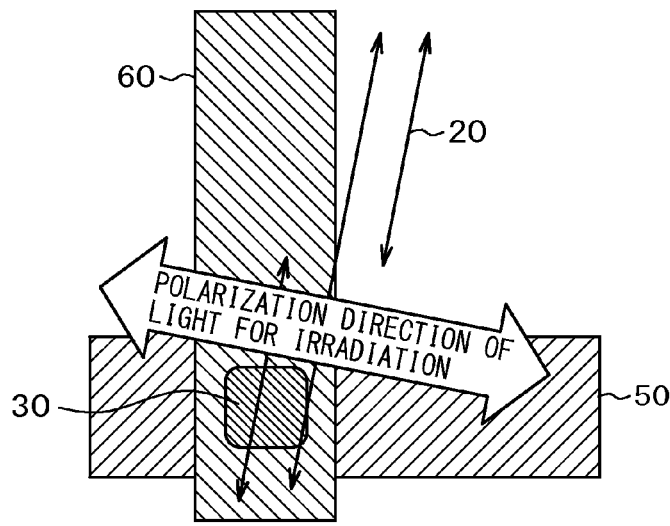
FIG. 8A is an enlarged view of a structure near a columnar spacer included in a liquid crystal display device according to a comparative example.
Figure 8B:
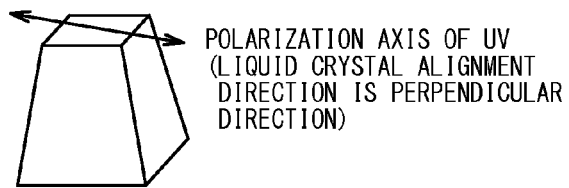
FIG. 8B is a perspective view of a structure near the columnar spacer included in the liquid crystal display device according to the comparative example.
Figure 8C:
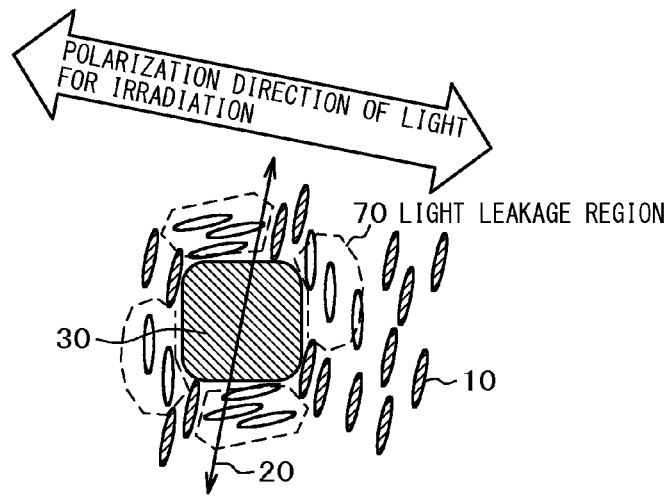
FIG. 8C is a diagram illustrating states of liquid crystal molecules existing near the columnar spacer included in the liquid crystal display device according to the comparative example.

FIGS. 8A to 8C are diagrams describing a structure of a liquid crystal display device according to a comparative example. FIG. 8A is an enlarged view of a region near a columnar spacer formed on the color filter substrate. FIG. 8B is a perspective view illustrating a relationship between a columnar spacer and a polarization axis of UV light. FIG. 8C is a diagram illustrating states of liquid crystal molecules around the columnar spacer.

As illustrated in FIG. 8A, the quadrangular column-shaped spacer 30 is arranged at a point at which the longitudinal black matrix portion 60 intersects with the lateral black matrix portion 50 at right angle. Two of four end sides of the quadrangular column-shaped spacer 30 are parallel to the longitudinal black matrix portion 60 and the other two end sides of the quadrangular column-shaped spacer 30 are parallel to the lateral black matrix portion 50. As illustrated in FIGS. 8A and 8B, since a direction 20 in which crystal liquid is initially aligned is inclined at a bias angle with respect to a direction in which the longitudinal black matrix portion 60 extends, a polarization axis of UV light or a light irradiation direction is not parallel to and not perpendicular to the four end sides of the quadrangular column-shaped spacer. Thus, as illustrated in FIG. 8C, alignment of liquid crystal molecules 10 existing around the columnar spacer 30 is distorted and light leaks in light leakage regions 70.

The invention claimed is:

1. A liquid crystal display device of a horizontal electric field type, comprising:
   a TFT substrate having a pixel electrode, and a common electrode facing the pixel electrode through an insulating film, a first photo aligned alignment film covering the surface of the TFT substrate;
   an opposing substrate facing the TFT substrate and having a second photo aligned alignment film covering a surface of the opposing substrate;
   a spacer arranged on the opposing substrate; and
   a liquid crystal layer arranged between the first photo aligned alignment film and the second photo aligned alignment film,
   wherein a liquid crystal of the liquid crystal layer is initially aligned at an inclined angle by a predetermined bias angle with respect to a direction in which the pixel electrode extends, in a plan view,
   wherein a top surface of the spacer having an one side which is arranged along a direction parallel to or perpendicular to a direction of the predetermined bias angle, in a plan view,
   wherein a side surface of the spacer corresponding to the one side is arranged along a direction parallel to or perpendicular to a direction of the predetermined bias angle,
   wherein the side surface is inclined with respect to the opposing substrate in a range of 60 to 80 degrees,
   wherein the first photo aligned alignment film and the second photo aligned alignment film are alignment-processed by the irradiation with a polarized light, and
   wherein the side surface reflects the polarized light.

2. The liquid crystal display device according to claim 1, wherein
   in a plan view, the spacer has a quadrangular-column shape with a substantially quadrilateral top surface, and
   each of four end sides of the substantially quadrilateral top portion of the spacer extend in a direction nearly parallel to or nearly perpendicular to the direction in which the liquid crystal is initially aligned.

3. The liquid crystal display device according to claim 1, further comprising:
   a first black matrix portion extending in a first direction and a second black matrix portion extending in a second direction,
   wherein the spacer is arranged at an intersection of the first black matrix portion and the second black matrix portion.

4. The liquid crystal display device according to claim 1, wherein
   a viewing angle is compensated for by different pixels,
   a first black matrix portion extending in a first direction and a second black matrix portion extending in a second direction,
   the top surface of the spacer has curved corners at four corners, in a plan view, and
   one of the curved corners is arranged at an intersection of the first black matrix portion and the second black matrix portion.

5. The liquid crystal display device according to claim 1, wherein
   a viewing angle is compensated for by adjacent two pixels,
   a first black matrix portion extending in a first direction and a second black matrix portion extending in a second direction,
   the top surface of the spacer has curved corners at four corners, in a plan view, and
   one of the curved corners is arranged at an intersection of the first black matrix portion and the second black matrix portion.

6. The liquid crystal display device according to claim 1, wherein
   the top surface of the spacer has curved corners at four corners, in a plan view,
   a first black matrix portion and a second black matrix portion extending in a first direction and a third black matrix portion extending in a second direction,
   one of the curved corners is arranged at an intersection of the first black matrix portion and the third black matrix portion,
   another of the curved corners is arranged at an intersection of the second black matrix portion and the third black matrix portion.

7. The liquid crystal display device according to claim 3, wherein
   the spacer has a quadrangular-column shape with a substantially quadrilateral top surface, in a plan view, and
   the spacer extends in a direction different from the first direction and the second direction.

8. The liquid crystal display device according to claim 1, further comprising:
   a plurality of drain lines,
   the plurality of drain lines are not parallel to or perpendicular to the one side or the direction in which the liquid crystal is initially aligned.

9. The liquid crystal display device according to claim 1, wherein
   the direction in which the liquid crystal is initially aligned is parallel to the TFT substrate and the opposing substrate.

10. The liquid crystal display device according to claim 1, wherein
    the side surface of the spacer is formed along a direction in which a polarized light doesn't change its polarization axis when reflected at the side surface.

11. The liquid crystal display device according to claim 1, wherein
    the spacer is arranged along a direction parallel to or perpendicular to a polarization direction of a polarized light.

12. A liquid crystal display device of a horizontal electric field type, comprising:
    a TFT substrate having a first photo aligned alignment film covering the surface of the TFT substrate;
    an opposing substrate facing the TFT substrate and having a first black matrix portion and a second black matrix portion extending in a first direction, a third black matrix portion extending in a second direction cross the first direction, and a second photo aligned alignment film covering a surface of the opposing substrate;
    a spacer arranged on the opposing substrate; and a liquid crystal layer arranged between the TFT substrate and the opposing substrate, wherein the first photo aligned alignment film and the second photo aligned alignment film are alignment-processed by the irradiation with a polarized light, the spacer is arranged on the first black matrix portion, the second black matrix portion, and the third black matrix portion, a top surface of the spacer has four corners, in a plan view, two corners of the four corners are arranged at an intersection of the first black matrix portion and the third black matrix portion, another two corners of the four corners are arranged at an intersection of the second black matrix portion and the third black matrix portion, and the top surface of the spacer has two long sides extending parallel to the third black matrix portion.

13. The liquid crystal display device according to claim 12, wherein the spacer has two side surfaces corresponding to the two long sides, and the two side surfaces are inclined with respect to the opposing substrate in a range of 60 to 80 degrees.

14. The liquid crystal display device according to claim 13, wherein the two side surfaces reflect the polarized light.

15. The liquid crystal display device according to claim 14, wherein the two side surfaces are formed so as not to change a polarization axis of the polarized light when the polarized light is reflected at the two side surfaces.

* * * * *